(12) United States Patent
Theiler

(10) Patent No.: US 9,591,394 B2
(45) Date of Patent: Mar. 7, 2017

(54) HEADPHONES, AUDIO DEVICE, AUDIO SYSTEM AND METHOD FOR TRANSMITTING SIGNALS

(75) Inventor: Helmut Theiler, Lieboch (AT)

(73) Assignee: AMS AG, Unterpremstaetten (AT)

( * ) Notice: Subject to any disclaimer, the term of this patent is extended or adjusted under 35 U.S.C. 154(b) by 378 days.

(21) Appl. No.: 14/126,391

(22) PCT Filed: Apr. 24, 2012

(86) PCT No.: PCT/EP2012/057477
§ 371 (c)(1),
(2), (4) Date: Mar. 24, 2014

(87) PCT Pub. No.: WO2012/171690
PCT Pub. Date: Dec. 20, 2012

(65) Prior Publication Data
US 2014/0205109 A1  Jul. 24, 2014

(30) Foreign Application Priority Data

Jun. 15, 2011 (DE) .................. 10 2011 104 268

(51) Int. Cl.
*H04R 1/10* (2006.01)
*H04R 3/00* (2006.01)
*H04L 7/00* (2006.01)
*H04L 7/10* (2006.01)
*H04J 7/00* (2006.01)

(52) U.S. Cl.
CPC ......... *H04R 1/1041* (2013.01); *H04R 1/1083* (2013.01); *H04R 3/005* (2013.01); *H04J 7/00* (2013.01); *H04L 7/0008* (2013.01); *H04L 7/10* (2013.01); *H04R 2201/107* (2013.01); *H04R 2420/09* (2013.01); *H04R 2460/01* (2013.01)

(58) Field of Classification Search
None
See application file for complete search history.

(56) References Cited

U.S. PATENT DOCUMENTS

| | | | |
|---|---|---|---|
| 7,283,635 | B1 | 10/2007 | Anderson et al. |
| 2004/0116151 | A1 | 6/2004 | Bosch et al. |
| 2007/0147640 | A1 | 6/2007 | Mottier et al. |
| 2008/0130911 | A1 | 6/2008 | Tsen |

(Continued)

FOREIGN PATENT DOCUMENTS

| | | |
|---|---|---|
| CN | 1350413 A | 5/2002 |
| CN | 101873363 A | 10/2010 |

(Continued)

*Primary Examiner* — Curtis Kuntz
*Assistant Examiner* — Qin Zhu
(74) *Attorney, Agent, or Firm* — McDermott Will & Emery LLP

(57) ABSTRACT

A set of headphones includes a connector with a first connection contact and a second connection contact as well as a loudspeaker, which is connected to the first connection contact in order to supply a loudspeaker signal. The set of headphones also includes a first and a second digital microphone, each of which is set up to generate a digital microphone signal, in particular with a binary bit stream. A multiplexer, which is coupled, at an output, to the second connection contact, is set up to generate a coded multiplex signal at the output on the basis of the microphone signals.

20 Claims, 5 Drawing Sheets

(56) References Cited

U.S. PATENT DOCUMENTS

Figure 1:
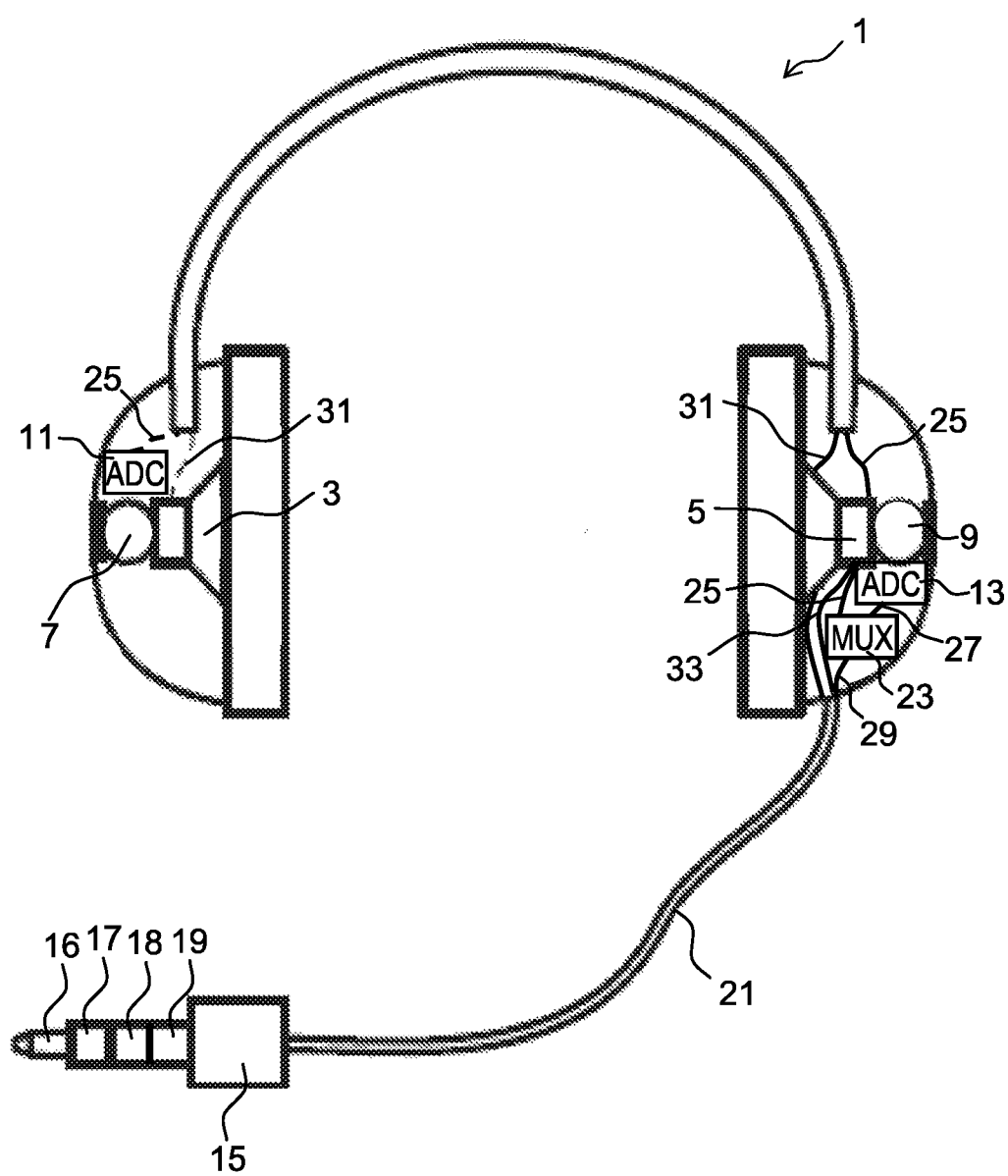

| | | | |
|---|---|---|---|
| 2009/0245529 A1* | 10/2009 | Asada | G10K 11/178 381/71.6 |
| 2010/0029344 A1* | 2/2010 | Enjalbert | H04M 1/6058 455/569.1 |
| 2010/0284525 A1 | 11/2010 | Sander et al. | |
| 2011/0116750 A1 | 5/2011 | Terlizzi et al. | |
| 2011/0194569 A1* | 8/2011 | Sander | H04J 3/1682 370/468 |
| 2012/0321097 A1* | 12/2012 | Braho | H04R 1/10 381/74 |

FOREIGN PATENT DOCUMENTS

| | | | |
|---|---|---|---|
| EP | 1199867 A1 | 4/2002 | |
| EP | 2395500 A1 | 12/2011 | |

\* cited by examiner

HEADPHONES, AUDIO DEVICE, AUDIO SYSTEM AND METHOD FOR TRANSMITTING SIGNALS

The invention relates to a set of headphones that has at least two microphones. The invention further relates to an audio device that can be connected to a set of headphones, and to an audio system that has such a set of headphones and such an audio device. The invention further relates to a method for transmitting signals in the case of a set of headphones.

In order to improve the tone quality when listening to headphones, noise suppression methods or noise reduction methods, in particular active noise reduction methods, are commonly used. Here, in the headphones, particularly in the vicinity of the loudspeaker of the headphones, noises, particularly environmental noises, are recorded, which are used after appropriate signal processing for the noise reduction, in the process of which, for example, a counter noise is additionally supplied to the loudspeaker in order to compensate for background noise.

In conventional headphones, analog microphones are used for this purpose, whose signals are processed, for example, in a signal processing unit in the headphones. Moreover, it is possible to apply the analog microphone signals via special lines to an audio device, which provides the loudspeaker signals and in addition carries out the processing of the analog microphone signals.

If the set of headphones is additionally implemented as a headset and accordingly, in addition to the microphone for noise reduction, an additional microphone is provided for voice recording, an additional signal is present that is to be transmitted from the set of headphones to the audio device.

Accordingly, in conventional headphones with noise reduction, a corresponding signal processing unit must be provided directly in the headphones, as a result of which the cost of the development and manufacture of the headphone is increased. If signal processing is provided in the audio device, it is necessary in conventional headphones to provide additional lines and a special or an additional connector for the headphones in order to transmit the microphone signals in addition to the usual loudspeaker signals. The use of a conventional connector for headphones with three or four connection contacts is accordingly not possible because of the additional lines.

A problem to be solved is to provide an improved design for the transmission of audio signals from a set of headphones that has at least two microphones.

This problem is solved by the subject matter of the independent claims. Embodiments and variants are the subjects of the dependent claims.

For example, in the case of a set of headphones, at least two digital microphones are provided, each of which supplies a digital microphone signal, in particular with a binary bit stream. Moreover, a multiplexer is provided that generates, from the digital microphone signals, a coded digital multiplex signal that can be transmitted via a single plug contact to a correspondingly connected audio device. Such an audio device processes the multiplex signal that is transmitted via the one contact or the one line in order to extract the digital microphone signals contained therein, for example, with a demultiplexer. The extracted signals can then be further processed by the audio device, for example, for noise reduction.

According to an embodiment, a set of headphones comprises a connector with a first connection contact and a second connection contact. A loudspeaker of the set of headphones is connected to the first connection contact for supplying a loudspeaker signal. The set of headphones furthermore comprises a first digital microphone, which is set up to generate a first digital microphone signal, in particular with a binary bit stream, and a second digital microphone, which is set up to generate a second digital microphone signal, particularly with a binary bit stream. The set of headphones also comprises a multiplexer that is coupled at an output to a second connection contact, and which is set up to generate a coded digital multiplex signal at the output, based on the first digital microphone signal and the second digital microphone signal.

Accordingly, it is possible to transmit several digital microphone signals via a single connection contact or via a single line to an audio device. By using digital microphones or digital microphone signals, one can also ensure a transmission with high signal quality. In particular, the microphone signals can be transmitted without quality reduction or quality loss.

The digital microphone signals comprise, for example, a delta-sigma converter, which converts a signal that is at first detected by analog means in a binary bit stream of higher frequency. For example, such a bit stream has a clock rate of approximately 1 MHz.

The set of headphones can be designed in different embodiments. For example, the set of headphones is designed as stereo headphones, so that the set of headphones comprises an additional loudspeaker, which is connected to an additional connection contact of the connector. In the vicinity of each of the two loudspeakers, one of the two digital microphones is attached, which is used for the active noise reduction. In another embodiment, the set of headphones is designed as mono headphones, wherein one of the two digital microphones is used for noise reduction, while the other digital microphone is used as a speech microphone for recording the speech or singing of the user of the set of headphones.

In additional embodiments, the set of headphones can also comprise additional digital microphones, whose signals are integrated by the multiplexer to form the multiplex signal. For example, stereo headphones with a speech microphone comprise such a third digital microphone, wherein one of the three digital microphones is used for speech, and the remaining two digital microphones are arranged in the area of the loudspeaker to allow an active noise reduction.

In addition, a connector of the set of headphones can also comprise an additional connection contact for supplying a reference potential or ground potential. Accordingly, in the above described embodiments, it is possible to provide a connector with four connection contacts, namely a connection contact for the reference potential, a connection contact for the multiplex signal, and two connection contacts for the loudspeaker signals. This makes it possible to use a conventional four-pole jack plug that is used, for example, in conventional headphones that have a speech microphone but not noise reduction microphones.

According to an embodiment, the set of headphones furthermore comprises a modulator, which is connected between the output of the multiplexer and the second connection contact, and which is set up to carry out a signal adaptation to the second connection contact on the basis of the multiplex signal. For example, the signal adaptation comprises a current modulation, in particular of a voltage signal, which is provided by an audio device at the second connection contact. Alternatively or additionally, the signal adaptation can also comprise a voltage modulation, in particular of a current signal, which in turn is provided by the audio device to the second connection contact. Moreover, it is also possible for the signal adaptation to comprise a controlled impedance switchover, which can be processed, for example, by a connected audio device.

In various embodiments, the generation of the multiplex signal by the multiplexer comprises a time multiplexing method, a code multiplexing method, a Manchester coding, or a combination of the mentioned methods. For example, in a time multiplexing method, a clock cycle period of the digital signal is subdivided into a corresponding number of time sections, in each of which one of the digital signals is transmitted. A multiplex signal coded with a time multiplexing method can also be provided with a Manchester coding in order to optimize a signal transmission. Alternatively or additionally, it is also possible to form a code from the various digital signals, which is transmitted in sections. Time multiplexing methods and code multiplexing methods can also be combined with each other, so that different signals are combined with each other in different time sections in order to form a corresponding code.

In an embodiment, the set of headphones furthermore comprises a control knob, by means of which at least one operating signal, in particular a binary operating signal, can be generated. Here, the multiplexer is set up to generate the coded multiplex signal in addition on the basis of the operating signal. Accordingly, it is possible, for example, for the coded multiplex signal to contain two or more digital microphone signals and the digital operating signal, and, for example, for it to be coded according to one of the above described multiplexing methods. Moreover, it is possible to provide several such control knobs on the set of headphones, the operating signals of which also enter into the multiplex signal.

According to another embodiment, the set of headphones furthermore comprises a supply circuit, which is connected at the input side to the second connection contact, and which is set up to provide a supply voltage or a supply current on the basis of a signal applied to the second connection contact. For example, the audio device to which the set of headphones is connected provides, at the second connection contact, a current signal or a voltage signal, which is converted by the supply circuit into a corresponding supply voltage or a supply current. The supply voltage or the supply current is used, for example, for the energy supply of the multiplexer and/or of the digital microphones or their analog-digital converters.

In an additional embodiment, the set of headphones furthermore comprises a clock generator, which is connected at the input side to the second connection contact, and which is set up to provide a reference clock signal on the basis of a signal applied to the second connection contact. For example, the audio device provides a signal at the second connection contact, which is superposed by a clock signal. The signal on which the clock signal is superposed can also be a current signal or voltage signal, which, as described above, is used for the generation of a supply voltage or of a supply current in the set of headphones. The clock generator can comprise, for example, a circuit for the extraction of the superposed clock signal. In addition, the clock generator comprises, for example, a phase locked loop, PLL, which generates the reference clock signal on the basis of the extracted clock signal.

According to another embodiment, the set of headphones is set up to deliver, in a startup phase, a predefined sequence to the second connection contact, which allows an identification of the set of headphones, in particular by an audio device. Such a sequence can be formed, for example, by a preamble, which is generated, for example, when a connection of the set of headphones has been detected, and which is supplied to the second connection contact. For example, by means of a predefined sequence, it is indicated to the audio device that a coded multiplex signal with digital microphone signals, and, if present, operating signals, will subsequently be transmitted via the second connection contact.

In addition, in various embodiments, the predefined sequence can comprise calibration data for the first digital microphone and/or for the second digital microphone. For example, during the production or at the end of the production of the set of headphones, calibration measurements of the microphones are carried out in order to achieve good or optimal results, in particular for the noise reduction. The calibration data can be used accordingly, for example, by a connected audio device during the signal processing.

In another embodiment, the set of headphones furthermore comprises a function detector, which is coupled on the input side to the second connection contact. The function detector is set up to detect, on the basis of a signal applied to the second connection contact, whether an audio device connected to the set of headphones is suitable for processing the multiplex signal. Moreover, the function detector is set up to deliver the multiplex signal to the second connection contact when the audio device is suitable, and to deliver an analog microphone signal to the second connection contact when the audio device is not suitable. For example, the set of headphones for this purpose comprises an additional analog microphone, or an analog signal is tapped at the digital microphone, or is obtained from the digital microphone signal. The detection of the ability of the connected audio device is based, for example, on a verification to determine whether a superposed clock signal is provided by the audio device at the second connection contact. As a result, it is also possible to use the set of headphones with a conventional audio device that cannot fully exploit the functionality of the set of headphones.

An embodiment of an audio device comprises a connector socket with a first connection contact and a second connection contact, wherein the connector socket is set up for the connection of a set of headphones, in particular according to one of the above described embodiment examples. The audio device furthermore comprises an audio generation device with an audio output that is connected to the first connection contact. The audio generation device is set up to generate a loudspeaker signal at the audio output on the basis of an audio signal and a correction signal. The audio device also comprises a demultiplexer, which is coupled on the input side to the second connection contact for supplying a coded multiplex signal, wherein the demultiplexer is set up to extract a first digital signal, in particular with a binary bit stream, and a second digital signal, in particular with a binary bit stream, from the multiplex signal. An audio processor of the audio device is set up to generate the correction signal on the basis of the first digital signal and/or the second digital signal in order to carry out an active noise reduction.

In particular, the audio device is accordingly suitable for connecting a set of headphones according to one of the above described embodiment examples, and to process the digital microphone signals or operating signals contained in the coded multiplex signal. Due to the digital interface with the microphones of the set of headphones, a high quality can be achieved in the background noise reduction. In addition, in the case of the audio device, a conventional connector socket can be used, which comprises, for example, four connection contacts corresponding to the above described embodiments. Thus, in a space-saving manner, the provision of additional connections or more expensive connector connections can be dispensed with. The audio device can be, for example, an audio player, in particular an MP3 player or a CD player, a mobile telephone or the like.

According to an embodiment, the audio device furthermore comprises a clock pulse generation device, which is set up to superpose a clock signal on the signal applied to the second connection contact. As a result, it is possible to make a clock signal available to a set of headphones connected to the connector socket, which signal can be used for the clock-controlled processes in the set of headphones. This is particularly helpful for the synchronized processing of signals in the set of headphones and in the audio device. Accordingly, it is possible to dispense with an additional synchronization between the set of headphones and the audio device. Moreover, the clock signal can be used as a basis for a reference clock pulse of the sampling of the analog-digital converter of the digital microphones, so that a fitting sampling rate can be set by the audio device in each case.

According to an additional embodiment, the demultiplexer is set up to extract an operating signal, in particular a binary operating signal, from the multiplex signal, wherein a function of the audio device can be controlled on the basis of the operating signal. For example, such an operating signal can trigger a volume regulation, a pause function, a fast-forward function or a rewind function in the case of the audio device, for example, when the latter is operated as an audio player. In addition, if the audio device is a mobile telephone, the operating signal can be used for accepting a conversation or ending a conversation, in particular if a connected set of headphones is provided with a speech microphone. Naturally, other functions of the audio device that are not listed here can also be controlled.

An embodiment of an audio system includes a set of headphones according to one of the above described embodiment examples, as well as an audio device according to one of the described embodiments, wherein the connector of the set of headphones is suitable to be received in the connector socket of the audio device in such a manner that the first connection contacts of the connector or of the connector socket are connected to each other, and the second connection contacts of the connector or of the connector socket are connected to each other. The audio device here is set up to carry out the noise reduction on the basis of the first digital microphone signal and/or the second digital microphone signal.

In an embodiment of a method for signal transmission in the case of a set of headphones that comprises a connector with a first connection contact and a second connection contact, a loudspeaker signal is supplied to a loudspeaker of the set of headphones via the first connection contact. With a first digital microphone, a first digital microphone signal is generated, in particular with a binary bit stream. Moreover, with a second digital microphone, a second digital microphone signal is generated, in particular with a binary bit stream. Moreover, on the basis of the first microphone signal and the second microphone signal, a coded multiplex signal is generated, which is provided via the second connection contact.

Further embodiments of the described method result from the above-described embodiment examples of the set of headphones or of the audio device. In particular, when generating the coded multiplex signal, additional digital microphone signals or digital operating signals can also be used.

The invention is further explained below using several embodiment examples in reference to the figures. Elements that are equivalent in terms of function or effect here bear the same reference numerals.

Figure 2:
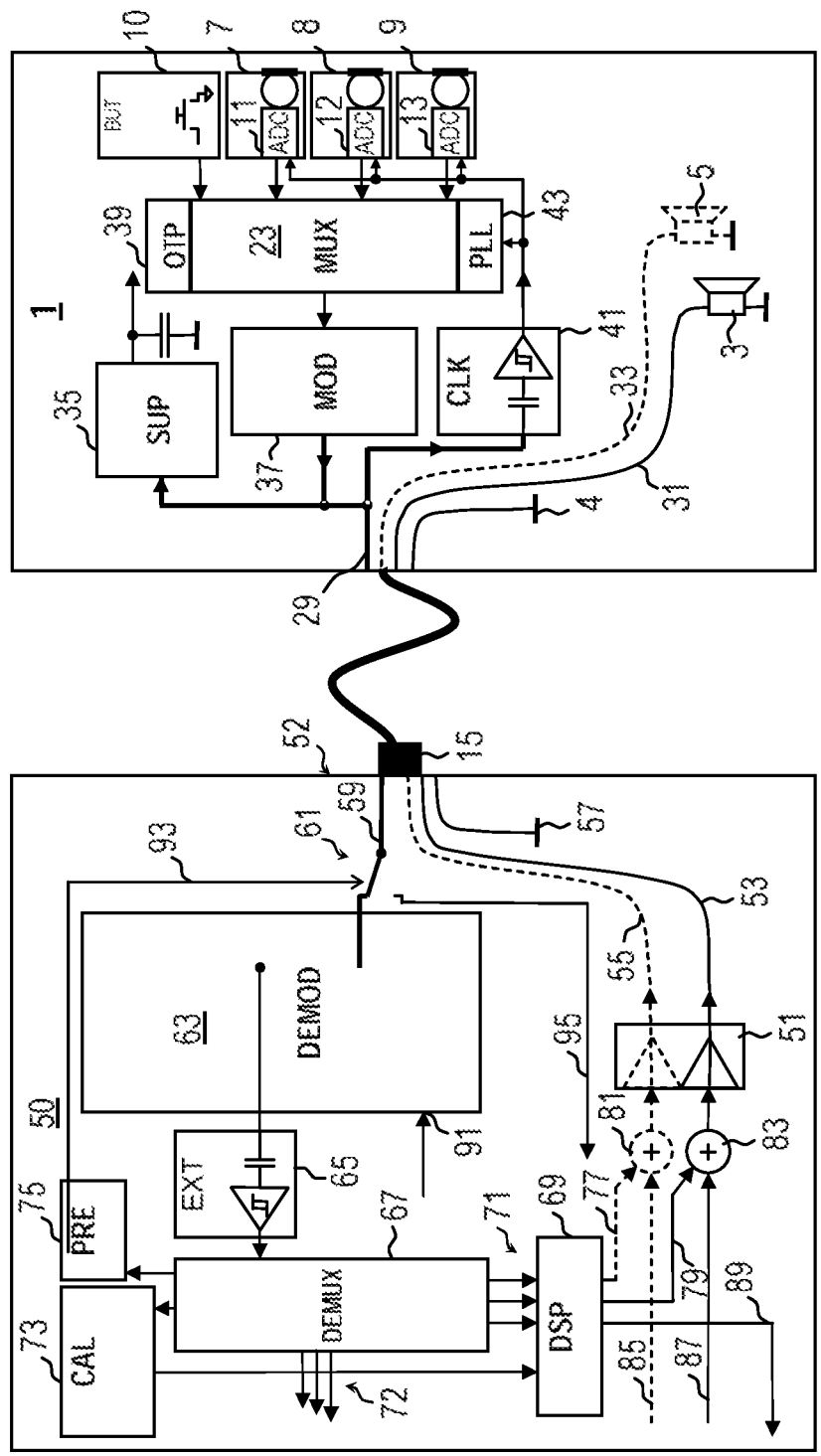
Figure 3:
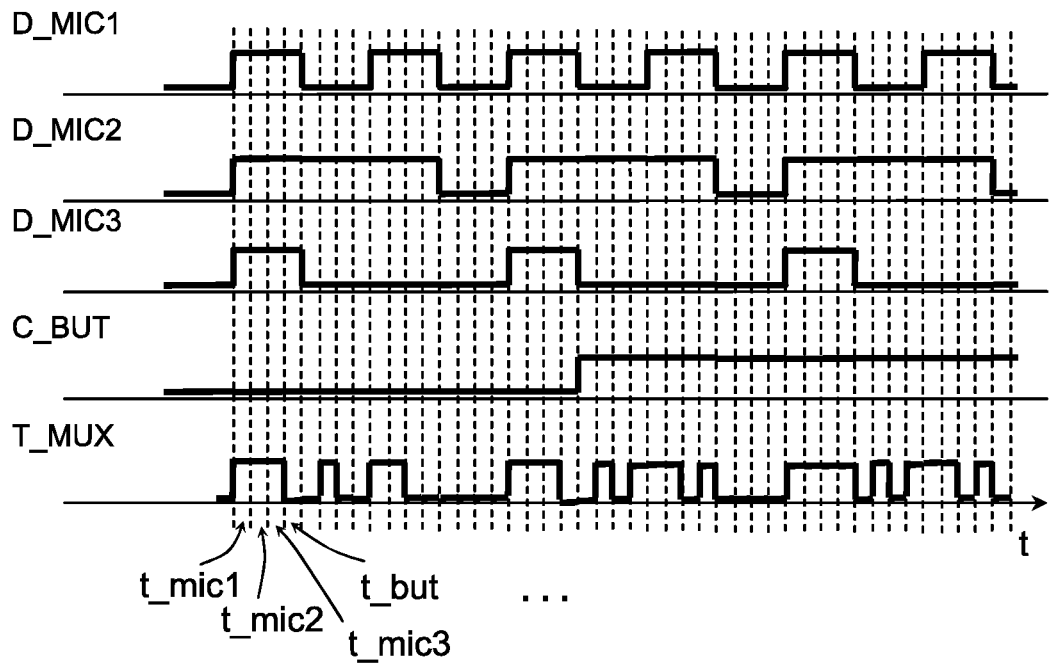
Figure 4:
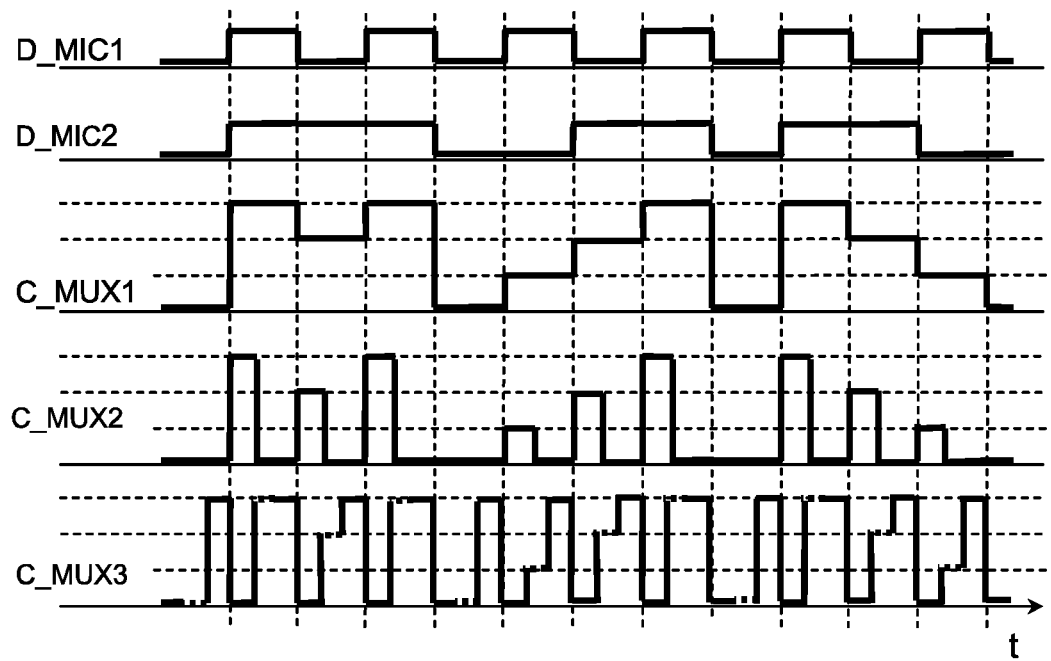
Figure 5:
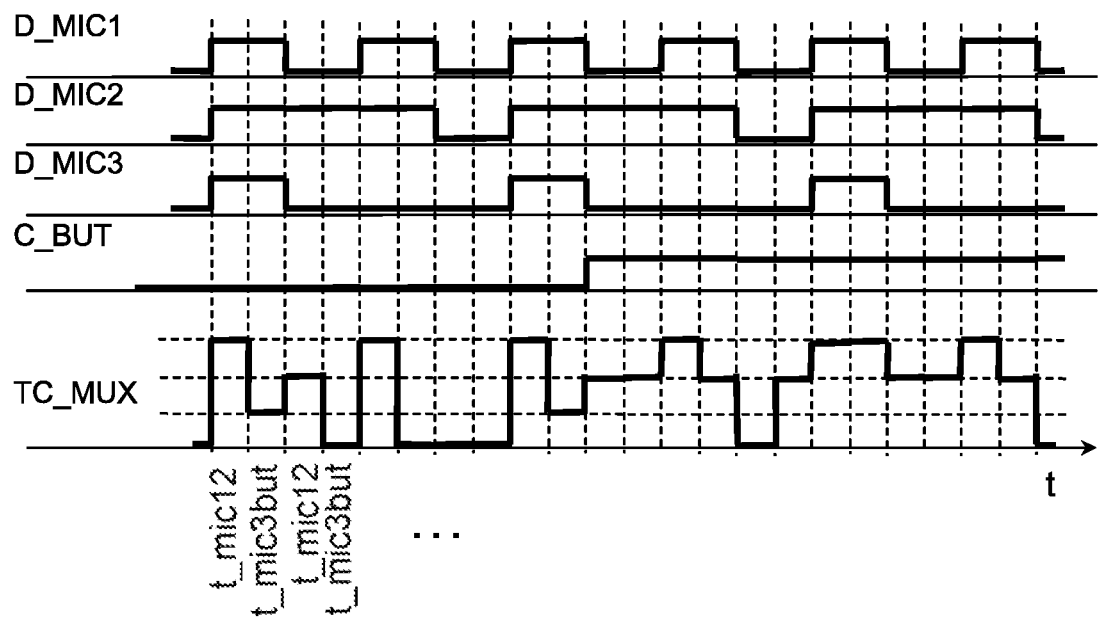
Figure 6:
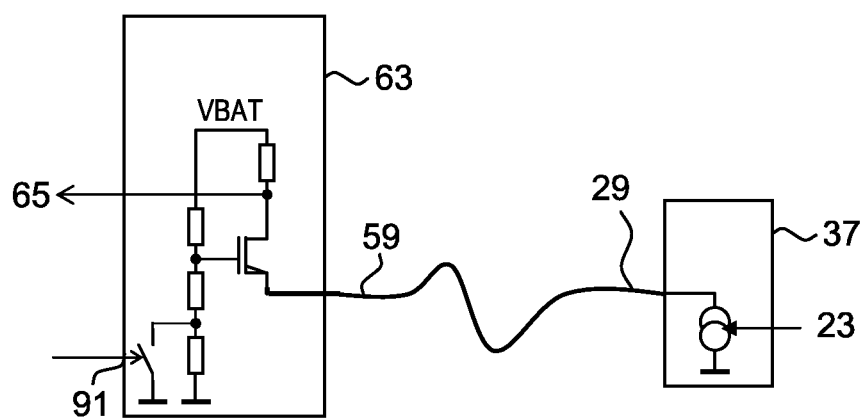
Figure 7:
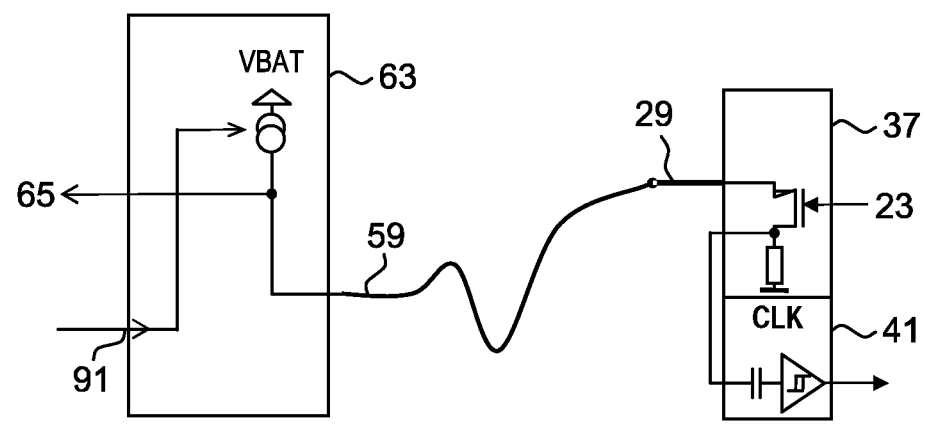
Figure 8:
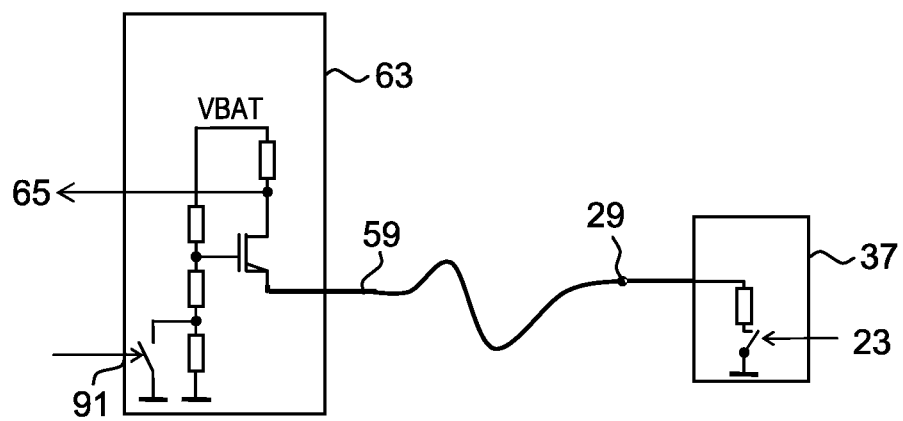
Figure 9:
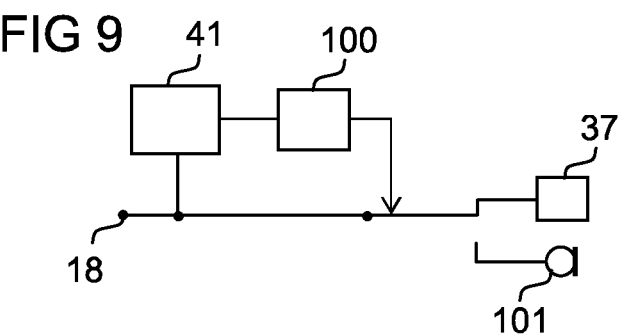

In the drawings:

FIG. 1 shows an embodiment example of a set of headphones,

FIG. 2 shows an embodiment example of an audio system with an audio device and with a set of headphones, FIG. 3 shows an example of a signal-time diagram of signals at a multiplexer of a set of headphones, FIG. 4 shows an additional example of a signal-time diagram of signals at a multiplexer of a set of headphones, FIG. 5 shows an additional example of a signal-time diagram of signals at a multiplexer of a set of headphones, FIG. 6 shows an embodiment example of component groups of an audio system, FIG. 7 shows an additional embodiment example of component groups of an audio system, FIG. 8 shows an additional embodiment example of component groups of an audio system, and FIG. 9 shows an embodiment example of a detail of a set of headphones.

FIG. 1 shows an embodiment example of a set of headphones 1 with a first, left loudspeaker 3 and with a second, right loudspeaker 5. Furthermore, the set of headphones 1 comprises a first and a second digital microphone 7, 9, which comprise a respective analog-digital converter ADC 11, 13. The set of headphones 1 comprises a connector 15 with connection contacts 16, 17, 18, 19, which is connected via a multi-core cable 21 to an earpiece of a set of headphones 1. This set of headphones 1 comprises a multiplexer MUX 23, which is connected on the input side via connection lines 25, 27 to the left or right digital microphone 7, 9, in particular to outputs of the analog-digital converter 11, 13. An output of the multiplexer 23 is connected via a line 29 to the connection contact 18 of the connector 15.

The first loudspeaker 3 is connected via a connection line 31 directly to the connection contact 16, while the second loudspeaker 5 is connected via a line 33 directly to the connection contact 17. The connection contact 19 of the connector 15 is used as a reference potential connection or a ground connection, wherein corresponding connections of the loudspeakers 3, 5 and of the microphones 7, 9 to the reference potential connection or to the connection contact 19 are not represented merely to simplify the representation.

Via the connection contacts 16, 17, analog loudspeaker signals, which are emitted acoustically by the loudspeakers 3, 5, are supplied to the loudspeakers 3, 5 in a conventional manner. The microphones 7, 9 each deliver, via their analog-digital converters 11, 13, a digital microphone signal, which is processed by the multiplexer 23 and combined to form a coded digital multiplex signal, which can be delivered via the connection contact 18 to an audio device that is not represented here.

In various embodiments, the set of headphones 1 can also comprise additional digital microphones, for example, a speech microphone of a headset. In addition, one or more operating buttons, in particular push buttons, can also be provided on the set of headphones 1, by means of which functions on the set of headphones 1 or on a connected audio device can be controlled. Such additional microphones or operating buttons are here connected to additional inputs of the multiplexer 23, so that additional microphone signals and/or operating signals are combined in the coded multiplexer signal. Using the represented embodiment and the described additional embodiments, it is possible to transmit a plurality of digital microphone signals and/or operating signals via a single connection contact to an audio device. The use of digital microphones or digital microphone signals in addition ensures a transmission with high signal quality; in particular, the microphone signals can be transmitted without quality reduction or quality loss.

FIG. 2 shows an embodiment example of an audio system with a set of headphones 1 and with an audio device 50 represented as a block diagram. The elements of the set of headphones 1, which are described in connection with FIG. 1, are not described again to avoid repetition. The set of headphones 1 represented here comprises an additional digital microphone 8 with integrated analog-digital converter 12. In addition, the set of headphones 1 includes an operating button BUT 10, represented as an example, which is implemented as a simple push button, for example. The analog-digital converters 11, 12, 13 are based, for example, on the principle of a sigma-delta converter and accordingly they each output a binary bit stream, which is supplied on the input side to the multiplexer 23. The operating button 10 is also connected on the input side to the multiplexer 23.

The set of headphones 1 furthermore comprises a supply circuit SUP 35, which is connected on the input side to the line 29, which leads to the connection contact 18—not shown here—of the connector 15. At the output of the supply circuit 35, a stabilization capacitor—not designated further—is provided, which is used as buffer for a supply voltage or a supply current generated by the supply circuit 35. Alternatively, a battery can also be provided in the set of headphones 1, which supplies the electronics of the set of headphones 1. As a result, it is possible, for example, to omit the supply circuit 35, or an additional energy source can be made available. As an additional alternative, it is possible to provide on the connector 15 an additional connection contact, which is reserved exclusively for a supply, for example.

The set of headphones 1 includes furthermore a modulator MOD 37, which is set up to modulate a multiplex signal delivered by the multiplexer 23 on the line 29. Various modulation possibilities are described in detail below in reference to FIG. 6, FIG. 7, and FIG. 8.

On the multiplexer 23, a memory unit 39 is provided, which is implemented, for example, as a one-time programmable, OTP memory. Alternatively, the memory unit 39 can also be implemented as EEPROM. In the memory unit 39, a predefined sequence, which allows an identification of the set of headphones 1, and calibration data for the digital microphones 7, 8, 9, are stored, for example.

The set of headphones 1 furthermore comprises a clock pulse generator, which comprises a clock pulse extraction unit CLK 41 and a phase locked loop PLL 43. By means of the clock pulse extraction unit, it is possible to extract, for example, on the basis of a signal applied to the line 29 or connection contact 18, clock pulse information that is used, for example, as sampling clock pulse for the analog-digital converters 11, 12, 13. Furthermore, from this clock signal, a reference clock signal for the multiplexer 23 can be generated with the phase locked loop. As a result, a sampling rate to be used by the analog-digital converters 11, 12, 13, can be set by the audio device 50. Alternatively, a clock pulse generation in the set of headphones 1 can occur by means of a circuit with a local oscillator.

The audio device 50 comprises a stereo amplifier unit 51, which is led on the output side with separate lines 53, 55 to a connector socket 52 of the audio device 50. Furthermore, in the audio device 50, a reference potential connection 57 and a line 59 are provided, which are connected via a switch 61 to a demodulator DEMOD 63. In the connector socket 52, the connector 15 of the set of headphones 1 is inserted in such a manner that the line 53 is electrically connected to the line 31, the line 55 to the line 33, the line 57 to a line 4, and the line 59 to the line 29. The connector socket 52 for this purpose comprises corresponding connection contacts for contacting the connection contacts 16, 17, 18, 19 of the connector 15.

The demodulator 63 receives, on the input side via the line 59, the modulated version of the coded multiplex signal, in order to deliver the reconstituted multiplex signal to the demultiplexer DEMUX 67 by means of the extraction block EXT 65 connected on the output side. The demultiplexer 67 is set up to separate the coded digital signals included in the multiplex signal and to reconstitute the original data streams. For example, correspondingly extracted digital microphone signals of the microphones 7, 8, 9 are delivered via a connection 71 to a signal processor DSP 69, while control data, which are based, for example, on a signal of the operating button 10, are delivered via the connection 72 for further processing. Furthermore, the demultiplexer 67 is also coupled to a calibration data memory CAL 73 and to a preamble detector PRE 75.

From the digital microphone signals, correction signals for the noise reduction are generated, for example, which are supplied via connections 77, 79 to adders 81, 83, which are connected on the output side to the amplifier unit 51. The correction signals are used, for example, for the compensation of ambient noise in or on the loudspeakers 3, 5 of the set of headphones 1. At each additional input of the adders 81, 83, audio signals are supplied via connections 85, 87, for example, by an audio player or by a receiving unit of a mobile telephone. At an additional output of the signal processor 69, a microphone signal of a speech microphone is delivered, for example, via a connection 89, for further processing. For example, a clock pulse signal is also supplied to the demodulator 63 at a connection 91, which signal the demodulator 63 uses for the superposition of a signal on the line 59 or 29, and which is used as the basis for the clock pulse extraction unit 41 in the set of headphones 1. In alternative embodiments, the extracted digital microphone signals can also be converted in the audio device to analog signals, in order to be able to carry out an analog signal processing for the noise reduction.

During the operation of the audio system, a voltage signal or current signal is generated by the audio device 50 via the demodulator 63 on the line 59 or 29, on which signal in particular the clock pulse signal at the input 91 is superposed. In an initialization phase, for example, in a phase after which the supply circuit 35 can generate a supply voltage or a supply current for the set of headphones 1, the multiplexer 23 reads from the connected memory unit 31 a predefined sequence or preamble, which is supplied via the modulator 37 and the elements 63, 65 to the multiplexer 67. There, the transmitted sequence is transmitted to the preamble detector 75, which as a result recognizes that a corresponding set of headphones with a corresponding multiplexed output signal is connected. Accordingly, via the connection 93, the switch 61 is switched or left so that the demodulator 63 is connected on the input side to the line 59. If another set of headphones is connected that does not comprise the mentioned functionality, then accordingly a predefined sequence or preamble can also not be received, so that the circuit 61 is switched in such a manner that the line 95 is connected to the line 59. In particular, in this situation, it is assumed that, via the line 59, an analog microphone signal is received that represents, for example, an analog signal of a speech microphone. The signal on the line 95 can accordingly be processed further.

However, if, as in the represented embodiment, a preamble can be transmitted and detected, then, in a subsequent section of an initialization phase, a set of calibration data can also be transmitted from the memory unit 39 to the audio device 50, wherein the set is stored, for example, in the calibration memory 73. The calibration data can include, for example, sensitivity information of the microphones and other properties regarding the microphones 7, 8, 9 and the loudspeakers 3, 5.

For example, microphones usually have a certain tolerance range in particular with regard to their sensitivity, which can be taken into consideration in order to achieve a best possible noise reduction. The stored calibration data is measured, for example, in a production phase or at the end of the production of the set of headphones 1 and stored in a memory unit 39. The calibration data can be transmitted in different embodiments with the preamble or integrated in the preamble, or after a transmission of the preamble.

The calibration data stored in the calibration data memory 73 are made available to the audio processor 69 during the operation of the audio device 50 in order to be able to obtain best possible correlation signals from the digital microphone signals.

In the multiplexer 23, different methods can be used for multiplexing the digital microphone signals and the operating signal. In FIG. 3, FIG. 4 and FIG. 5, various possibilities for multiplexing methods are represented as examples.

FIG. 3 shows a signal-time diagram of signals on the multiplexer 23, wherein the input signal sequences D_MIC1, D_MIC2, D_MIC3, C_BUT are selected only as examples. In the present signal-time diagram, a purely time multiplexing method has been used, in which a clock phase in accordance with the sampling rate of the digital microphones is subdivided in as many time sections as there are signals to be combined. Accordingly, in the present representation, in each case a sampling period is subdivided into four time sections that follow one another, and that repeat cyclically with regard to their assignment to the input signals. Consequently, in the first time section t_mic1, the value of the signal D_MIC1 is transmitted, in the second time section t_mic2, the value of the signal D_MIC2, in the third time section t_mic3, the value of the signal D_MIC3, and in the fourth time signal t_but, the value of the signal C_BUT.

A synchronization between the multiplexer of the set of headphones 1 and the multiplexer 67 of the audio device 50 can occur, for example, on the basis of the operating signal C_BUT, where a low signal level can be expected on a regular basis, which extends over several sampling periods of the microphone signals D_MIC1, D_MIC2, D_MIC3. Alternatively, an additional time section can also be provided in the multiplex signal that is used for the synchronization. Accordingly, instead of four cyclically changing time sections, as represented here, five time sections would have to be selected.

In the case of a multiplex signal that is based on a purely time multiplexing method, a Manchester coding, which in itself is known, can also be used in order to reduce or exclude direct current or low frequency components in the signal in the transmission line. This can have an advantageous effect, for example, on the electronics in the set of headphones if an energy supply occurs via the same connection line and the electronics has a weak power supply rejection ratio.

FIG. 4 shows an additional signal-time diagram with microphone signals D_MIC1, D_MIC2 to be transmitted together and differently implemented multiplex signals C_MUX1, C_MUX2, C_MUX3, each of which represents a specific variant of a code multiplexing method. In the case of a purely code multiplexing method, the coded multiplex signal comprises not only two signal levels, but the number of the signals to be combined as an exponent of the number 2. In this manner it is possible to achieve that the multiplex signal has a lower data rate than in the case of a purely time multiplexing method, wherein, as a result of the increased number of the signal levels to be transmitted, more stringent requirements are placed on the demultiplexer in order to detect the different levels. A synchronization between the multiplexer and demultiplexer can occur on the basis of signal slopes, which can usually be detected easily.

In the case of the multiplexing signal C_MUX1, a full-time coding occurs, in which, during the entire sampling period, a coded signal level is transmitted. In the multiplex signal C_MUX1, the microphone signal D_MIC1 is weighted with a level, while the microphone signal D_MIC2 is weighted with two levels. In the case of the second multiplex signal C_MUX2, the same level value as with the first multiplex signal C_MUX1 is transmitted, but only during a portion of a sampling period. This can have an advantageous effect on the transmission of a supply voltage via the same line that is used for the transmission of the multiplex signal. If the multiplex signal returns to zero in each sampling period for a certain portion of the sampling period and this zero value is transmitted as a current-free operating state, the supply line is usually under a lesser load caused by the code transmission.

An additional variant for a code multiplexing method is represented with the third multiplex signal C_MUX3, which can be referred to as a minimum-code maximum-code multiplexing method. Here, a sampling period is subdivided into three time sections, wherein in the first time section, a minimum value for available codes is transmitted, during a second time section, the multiplex code proper to be transmitted is transmitted, and during a third time section, a maximum value of codes to be transmitted is transmitted. As a result, a higher detection precision, in particular, can be achieved on the side of the demultiplexer.

In FIG. 5, an additional signal-time diagram is represented as an example, in which the coded multiplex signal TC_MUX is generated based on a combination of a time multiplexing method and a code multiplexing method. Accordingly, cyclically repeating time sections are provided again, in which, in each case, a portion of the signals to be combined is combined with a code. For example, in a first time section t_mic12, a coding of the microphone signals D_MIC1, D_MIC2 is carried out, while in a second time interval t_mic3but, a coding of the microphone signal D_MIC3 and the operating signal C_BUT occurs. In comparison to a purely time multiplexing method, lower data rates in the multiplex signal are required in this embodiment. In comparison to a purely code multiplexing method, fewer code levels are required for each coding in a time section, so a more reliable detection of the respective level in the demodulator can occur in a simplified manner.

FIG. 6 shows an embodiment of a modulator 37 and a modulator 63, which are connected to one another via the line 59 or 29. In the represented embodiment, a current modulation is carried out by the modulator 37 on the basis of the multiplex signal, which is supplied by the multiplexer 23. In particular, a current source in the modulator 37 is controlled by the multiplexer 23, in order to modulate the current that is provided in the line 29 by the audio device 50 or by the demodulator 63. This current modulation can be detected or extracted on the side of the audio device via a current drop via a measurement resistor. In this operating mode, the demodulator 63 provides a supply for the line 29 as voltage source. This voltage source can also be modulated in various embodiments in order to transmit a clock signal as a sampling clock signal from the audio device to the set of headphones, represented in the drawing by the signal at the connection 91. The voltage levels of the voltage modulation comprise, for the purpose of superposing the clock signal on the supply voltage of the line, preferably moderate or small differences, so that the supply circuit 35 in the set of headphones is able to supply the electronics on a permanent basis and reliably.

FIG. 7 shows an additional embodiment example with modulator 37 and demodulator 63, wherein a voltage modulation is carried out on the side of the modulator 37. The digital output signal of the multiplexer 23 in this embodiment controls a voltage in the line 59, 29 via a shunt regulator. In this operating mode, the line 29 is supplied by the audio device with a current source or with a resistor. This current source or this resistor can also be modulated in order to be able to transmit a clock signal from the audio device to the set of headphones. In a manner similar to the above described embodiment of the current modulation, it is advantageous to select low level differences for the superposed clock signal in order to ensure a secure operation of the supply circuit 35 in the set of headphones 1.

FIG. 8 shows an additional embodiment of a modulator 37 with demodulator 63, wherein a control impedance commutation occurs. The multiplex signal of the multiplexer 23 in this embodiment switches a resistive load on the line 29 in order to change the impedance of the set of headphones, which acts on the line 29. In the represented embodiment, on the side of the demodulator 63, a current source is provided, wherein a detection of the signal to be transmitted occurs via a measurement resistor. Alternatively, a current source on the side of the demodulator can also be used, similarly to the representation shown in FIG. 7.

In an additional embodiment, the coded digital multiplex signal can be also designed by modulation of a carrier for the transmission between headphones and audio device, in particular by frequency shift keying, FSK, or phase shift keying, PSK.

FIG. 9 shows as an example of an embodiment detail of the set of headphones 1. Here, to the clock pulse extraction unit 41 known from FIG. 2, a function detector 100 is connected, which checks whether a clock signal can be detected at the connection contact 18 by the clock pulse extraction unit 41. If such a clock signal is detected, this can be evaluated as an indication that the connected audio device is suitable for processing a multiplex signal supplied by the multiplexer 23. Accordingly, a circuit is controlled in such a manner that the connection contact 18 is connected to the output of the modulator 37. However, if no clock signal is detected at the connection contact 18, the assumption is made that the connected audio device can only process analog microphone signals. Accordingly, the circuit is controlled in such a manner that an additional analog microphone 101 is connected electrically to the connection contact 18. Alternatively, it is also possible to connect, instead of the analog microphone 101, an analog reverse configured digital microphone signal to the connection contact 18. A reverse conversion to an analog microphone signal can occur in the case of a binary bit stream, for example, by simple low pass filtering.

The described embodiments are selected only as examples and, in particular, they can be combined with one another.

The invention claimed is:

1. A set of headphones comprising:
 a connector with a first connection contact and a second connection contact;
 a loudspeaker, which is connected to the first connection contact in order to supply a loudspeaker signal;
 a first digital microphone, which is set up to generate a first digital microphone signal, in particular with a binary bit stream;
 a second digital microphone, which is set up to generate a second digital microphone signal, in particular with a binary bit stream;
 a multiplexer, which is coupled, at an output, to the second connection contact, and which is set up to generate a coded multiplex signal at the output on the basis of the first microphone signal and of the second microphone signal; and
 a modulator, which is connected between the output of the multiplexer and the second connection contact, and which is configured to perform a signal adaptation at the second connection contact based on the coded multiplex signal in order to carry out a background noise reduction.

2. The set of headphones according to claim 1, wherein the signal adaptation includes at least one of the following:
 a current modulation, in particular of a voltage signal;
 a voltage modulation, in particular of a current signal; and
 a controlled impedance commutation.

3. The set of headphones according to claim 1 or 2, in which the generation of the multiplex signal includes at least one of the following:
 a time multiplexing method;
 a code multiplexing method; and
 a Manchester coding.

4. The set of headphones according to claim 1 or 2, further comprising at least one operating button, with which at least one digital or binary operating signal can be generated, wherein the multiplexer is set up to generate the coded multiplex signal in addition on the basis of the operating signal.

5. The set of headphones according to claim 1 or 2, further comprising a supply circuit, which is connected on the input side to the second connection contact, and which is set up to provide a supply voltage or a supply current on the basis of a signal applied to the second connection contact.

6. The set of headphones according to claim 1 or 2, further comprising a clock pulse generator, which is connected on the input side to the second connection contact, and which is set up to provide a reference clock signal on the basis of a signal applied to the second connection contact.

7. The set of headphones according to claim 1 or 2, which is configured to deliver, in a startup phase, a predefined signal sequence to the second connection contact, which allows an identification of the set of headphones.

8. The set of headphones according to claim 7, wherein the predefined signal sequence includes calibration data for the first digital microphone and/or for the second digital microphone.

9. The set of headphones according to claim 1 or 2, further comprising a function detector, which is coupled on its input side to the second connection contact, and which is configured:

to detect, on the basis of a signal applied to the second connection contact, whether an audio device connected to the set of headphones is suitable for processing the multiplex signal;

to deliver the multiplex signal to the second connection contact if the audio device is suitable; and to deliver an analog microphone signal to the second connection contact if the audio device is not suitable.

10. An audio device, comprising:

a connector socket with a first connection contact and a second connection contact, wherein the connector socket is set up for the connection of a set of headphones;

an audio generation device with an audio output, which is connected to the first connection contact, the audio generation device set up for the generation of a loudspeaker signal at the audio output on the basis of an audio signal and a correction signal;

a demodulator, which is coupled on its input side to the second connection contact for receiving a modulated version of a coded multiplex signal and which is configured to provide a recovered version of the multiplex signal based thereon;

a demultiplexer, which is coupled on its input side to the demodulator for receiving the recovered version of the multiplex signal, and which is set up to extract a first digital signal, in particular with a binary bit stream, and a second digital signal, in particular with a binary bit stream, from the multiplex signal; and an audio processor, which is set up to generate the correction signal on the basis of the first digital signal and/or the second digital signal, in order to carry out a background noise reduction.

11. The audio device according to claim 10, further comprising a clock pulse generation device, which is set up to superpose a clock signal on the signal applied to the second connection contact.

12. The audio device according to claim 10 or 11, wherein the demultiplexer is further set up to extract a digital or binary operating signal from the multiplex signal, wherein a function of the audio device can be controlled on the basis of the operating signal.

13. An audio system comprising:

a set of headphones comprising:

a connector with a first connection contact and a second connection contact;

a loudspeaker, which is connected to the first connection contact in order to supply a loudspeaker signal;

a first digital microphone, which is set up to generate a first digital microphone signal, in particular with a binary bit stream;

a second digital microphone, which is set up to generate a second digital microphone signal, in particular with a binary bit stream; and a multiplexer, which is coupled, at an output, to the second connection contact, and which is set up to generate a coded multiplex signal at the output on the basis of the first microphone signal and of the second microphone signal;

a modulator, which is connected between the output of the multiplexer and the second connection contact, and which is configured to perform a signal adaptation at the second connection contact based on the multiplex signal; and an audio device according to one of claims 10-11, wherein the connector of the set of headphones is suitable to be received in the connector socket of the audio device in such a manner that the respective first connection contacts are connected to one another, and the respective second connection contacts are connected to one another, and wherein the audio device is set up to carry out the background noise reduction on the basis of the first digital microphone signal and/or the second digital microphone signal.

14. A method for signal transmission with a set of headphones, which comprises a connector with a first connection contact and a second connection contact, the method comprising:

supplying a loudspeaker signal to a loudspeaker of the set of headphones via the first connection contact;

generating a first digital microphone signal, in particular with a binary bit stream, with a first digital microphone;

generating a second digital microphone signal, in particular with a binary bit stream, with a second digital microphone;

generating a coded multiplex signal on the basis of the first microphone signal and the second microphone signal;

carrying out a signal adaptation at the second connection contact based on the multiplex signal by performing a modulation; and providing the adapted signal via the second connection contact in order to carry out a background noise reduction.

15. The method according to claim 14, wherein the signal adaptation includes at least one of the following:

a current modulation, in particular of a voltage signal;

a voltage modulation, in particular of a current signal; and a controlled impedance commutation.

16. The method according to claim 14, wherein the generation of the multiplex signal includes at least one of the following:

a time multiplexing method;

a code multiplexing method; and a Manchester coding.

17. The method according to claim 14, wherein at least one operating signal, in particular a binary operating signal, is generated based on the actuation of at least one operating button, and wherein the coded multiplex signal is generated in addition on the basis of the operating signal.

18. The method according to claim 14, wherein, in a startup phase, a predefined sequence is delivered to the second connection contact, the predefined sequence allowing an identification of the set of headphones.

19. The method according to claim 14, further comprising:

detecting, on the basis of a signal applied to the second connection contact, whether an audio device connected to the set of headphones is suitable for processing the multiplex signal;

providing the multiplex signal to the second connection contact if the audio device is suitable; and providing an analog microphone signal to the second connection contact if the audio device is not suitable.

20. The set of headphones according to claim 9, wherein the function detector is configured to identify the audio device as suitable, if a clock signal provided by the audio device is detected at the second connection contact.

* * * * *